United States Patent [19]

Godsey et al.

[11] Patent Number: 5,046,085
[45] Date of Patent: Sep. 3, 1991

[54] INTERFACING SYSTEM FOR AN INTERNATIONAL-TYPE PAY-TELEPHONE

[76] Inventors: Randall D. Godsey, 170 Austin Ave., Carpentersville, Ill. 60110; Charles T. Walneck, 120 Lakeshore Dr., Cary, Ill. 60013; James Santee, 24675 N. Jensen Ave., Cary, Ill. 60013; Ronald J. Gaulke, 11706 Kenneth Ave., Huntley, Ill. 60142; Luis R. Ortez Perez, 10-D-5 Chestnut Hill Ave., Cambridge Park, Rio Piedras, P.R. 00926; Alexis T. Ramos, Lomas de Carolina, Calle 7, Bloque L #3, Carolina, P.R. 00630

[21] Appl. No.: 524,192

[22] Filed: May 15, 1990

[51] Int. Cl.⁵ .................. H04M 17/00; H04M 15/10; H04M 7/16
[52] U.S. Cl. ..................................... 379/112; 379/63; 379/132; 379/155
[58] Field of Search ................... 379/112, 59, 63, 115, 379/132, 146, 155

[56] References Cited

U.S. PATENT DOCUMENTS 4,924,497 5/1990 Smith et al. ...................... 379/132

Primary Examiner—Stafford D. Schreyer
Attorney, Agent, or Firm—Milton S. Gerstein; Marvin N. Benn

[57] ABSTRACT

An interface unit for coupling an international-type pay-telephone to a land-based or cellular telephone system. The interfacing unit of the invention has a microcomputer, and an associated EPROM in which is stored the exchanges of the telephone numbers that are accessible by that local payphone-terminal, which EPROM also stores a table indicative of the tariffing rates associated with the respective exchanges called. The invention also includes the tone-detectors for detecting the dialed DTMF digits of the pay-telephone, for the conversion thereof for storage in the microcomputer for the determination of a valid telephone number dialed in order to determine the associated tariffing rates. The tone detectors also detect the tone-signals received from the telephone system. The invention also includes "isolating" switching circuitry for isolating the coin-operated pay terminal from its couplement to the telephone system until the telephone call has been connected. After a call has been made according to the invention, the microcomputer, after having determined the tariffing schedule for that particular call made, will generate 12K to 16K tone-bursts to the international-type payphone terminal required for debiting the required amount from the coins or credit initially inserted into the payphone.

34 Claims, 9 Drawing Sheets

INTERFACING SYSTEM FOR AN INTERNATIONAL-TYPE PAY-TELEPHONE

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to an interfacing unit for an international-type coin-operated pay telephone, for example that manufactured by Sodeco, Ltd. of Switzerland, and commonly referred to as a Landis-Gyr international-type coin operated telephone. European, and other international, pay-telephone systems differ from their U.S. counterpart in that the telephone system's central office determines the consumption of the initial coins inserted into the coin-operated telephone via the generation of periodic tone-bursts, commonly within a 12K to 16k range. The frequency of the generation of these tone-bursts by the central office determines the frequency of the debiting at the payphone terminal of the coins inserted. Therefore, when making a long distance call that is more expensive than another long distance call, the central office will generate more frequent tone-bursts to the international-type coin-operated telephone, thereby debiting the terminal more frequently in the base coin-units of that particular country.

It is known to retrofit a conventional, U.S.-type, coin-operated telephone, such that the local payphone terminal is equipped with tariffing information, by which the payphone is monitored and charged via information stored at the local site. This is achieved by including at the local terminal site a listing of all of the exchanges to which one may make an outgoing call, and a listing of the associated tariff rates. There are retrofitting units that retrofit U.S. payphones such that tariffing is achieved at the local site. However, coin collection is still to be based upon the conventional, U.S. method of generation of reverse-polarity signals by a central office of the land-based, switched telephone-network. It is also known to couple such U.S. payphones to a cellular transceiver via a conventional cellular interface unit.

The present invention is directed to an interfacing unit that is coupled to an "International"-type payphone, such as the Landis-Gyr, coin-operated pay-telephone, which interfacing unit of the invention assumes all of the functions of the central office, so that private payphones may be readily and easily provided at any chosen site, whether such payphone be coupled directly to the land-based, switched telephone network, or be coupled to a cellular, or other radio, telephone system.

SUMMARY OF THE INVENTION

It is the primary objective of the present invention to convert a conventional, "International"-type, coin-operated pay-telephone, such that central office functions are generated locally at the payphone-terminal proper.

It is another objective of the present invention to, specifically, generate tone-bursts locally at the pay telephone site, by the generation of particular tone-frequencies determinative of the cost of the call, what is generally termed "tariffing."

It is yet another objective of the present invention to allow for such central-office functioning at the local, pay telephone-terminal site, such that tariffing itself is done locally, with the determination of a valid telephone call as well as all tone-detections being done at the local payphone-terminal site.

It is an objective of the present invention also to provide for the disconnection of the pay telephone proper from the central office, or, alternatively, to its connection to a cellular interface unit, during the call-progress monitoring connection of the call to the called party, so as to isolate the pay-telephone terminal so as to prevent interference with the tones generated during the call-progressing.

Toward these and other ends, the interfacing unit of the present invention comprises a microcomputer, and an associated EPROM in which is stored the exchanges of the telephone numbers that are accessible by that local payphone-terminal, which EPROM also stores a table indicative of the tariffing rates associated with the respective exchanges called. The invention also includes the tone-detectors for detecting the dialed DTMF digits of the coin-operated pay-telephone, for the conversion thereof for storage in the microcomputer for the determination of a valid telephone number dialed in order to determine the associated tariffing rates. The tone detectors also include conventional tone-detectors for detecting the tones received from the central office, or, alternatively, tones received via the over-the-air radio transmission, such as the cellular network, via a conventional cellular interfacing unit, manufactured by Telular, Inc., which tone-detectors determine the various signals common to the generation and completion of a telephone call, such as tones representative of busy signals, as well as ringback signals. The invention also includes "isolating" switching circuitry for isolating the coin-operated pay terminal from its couplement to the telephone system until the telephone call has been connected. This isolation, achieved through switching circuitry, is performed in order to prevent any noise or feedback from the pay telephone terminal that would in any way disrupt the call-progressing signals generated by the central office to the payphone-terminal. The switching circuitry, after having separated, or isolated, the payphone-terminal from its connection with the central office, will, however, switch over to a secondary unit that couples the payphone-terminal to the tone detectors in order that the person making the call may be able to hear the tones received from the central office, such as busy signals, audible ring signal, and the like, in order to simulate a conventional telephone.

The present invention may be used for land-line connection through a standard, land-telephone switching network, by which the pay-telephone is directly connected to the central office via land lines, or, may, alternatively, be used with a cellular network, by coupling the interface unit of the present invention to a conventional cellular interface unit that is coupled to a standard cellular transceiver, such cellular interface unit being conventional and manufactured by Telular, Inc., of Wilmette, Illinois, which cellular interface unit is disclosed in U.S. Pat. Nos. 4,658,096 and 4,737,975. There is, therefore, achieved at the local payphone terminal-site all of the functions hitherto generated by the central office. By localizing such central-office functions at the local payphone-terminal site, private payphones may be easily and readily provided. After a call has been made according to the invention, the microcomputer, after having determined the tariffing schedule for that particular call made, will generate 12K to 16k or 50 hertz tone-bursts to the international-type payphone terminal required for debiting the required amount from the coins or credit initially inserted into the payphone, which debiting occurs by decrements in the base currency unit of the respective country. The more expensive the call being made, the more frequent the 12K to 16k or 50 hertz tone-bursts are generated.

BRIEF DESCRIPTION OF THE DRAWINGS

The invention will be more readily understood with reference to the accompanying drawings, wherein.

DETAILED DESCRIPTION OF THE INVENTION

Figure 1:
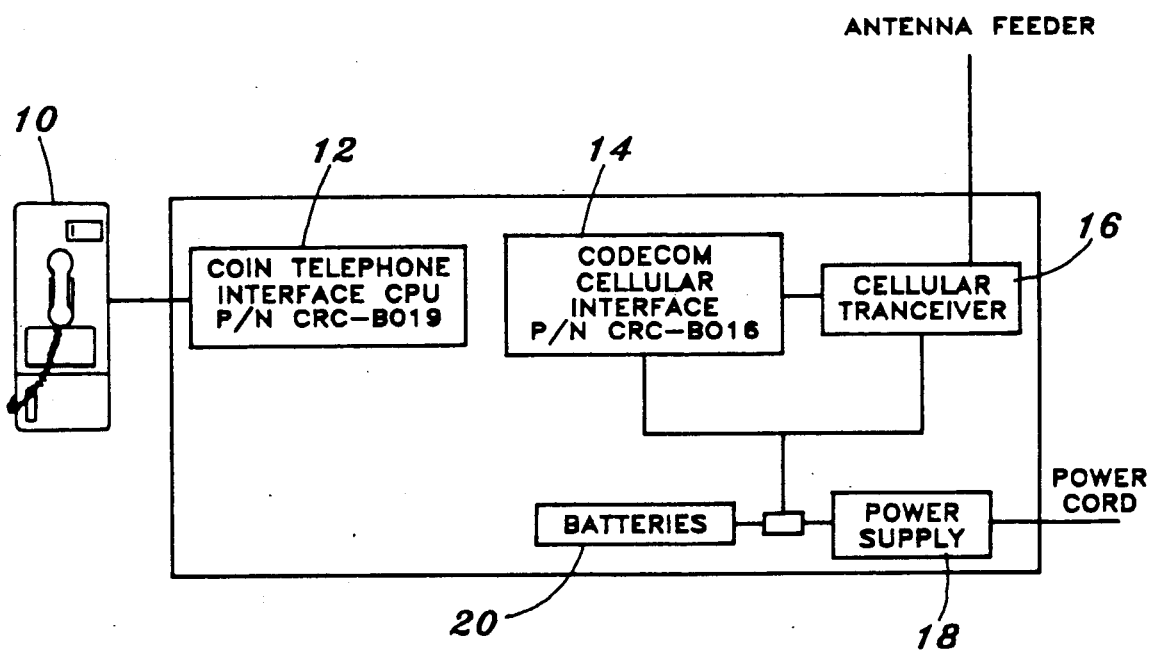
FIG. 1 is a block diagram of the overall system of the present invention coupled between a cellular transceiver via a conventional cellular interface unit and to a conventional international-type, coin-operated pay-telephone.

Referring now to the drawings in great detail, FIG. 1 shows the elements of the invention. A conventional international-type, coin-operated pay-telephone 10 is coupled to the cellular network, in this embodiment, via the interfacing system 12 of the present invention. The interfacing system of the invention, in turn, is coupled to a conventional cellular interface-unit 14, such as that manufactured by Telular, Inc. of Wilmette, Illinois, which, in turn, is coupled to a conventional, cellular transceiver 16 for over-the-air radio transmission to a base site, for subsequent connection to either a land-based switched telephone network, or to the cellular base station and another cellular phone. In the alternative embodiment, the interface unit 12 may be coupled directly via the land line to the conventional, land-based switched telephone network. Power is derived via conventional power supply 18 and batteries 20.

Figure 2:
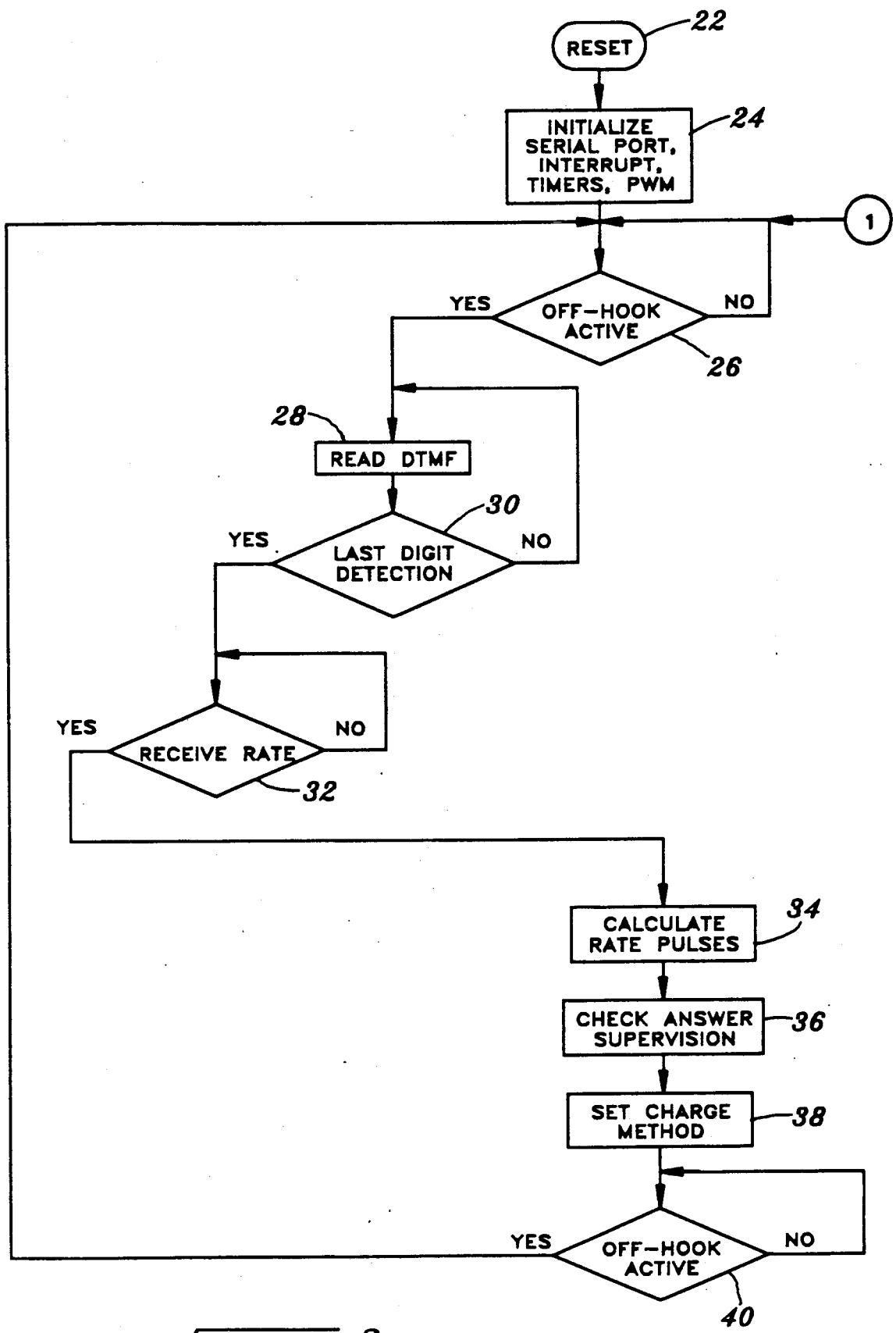
FIG. 2 is a flow diagram showing the sequence of events for completing a call over the system of the invention.
Figure 3:
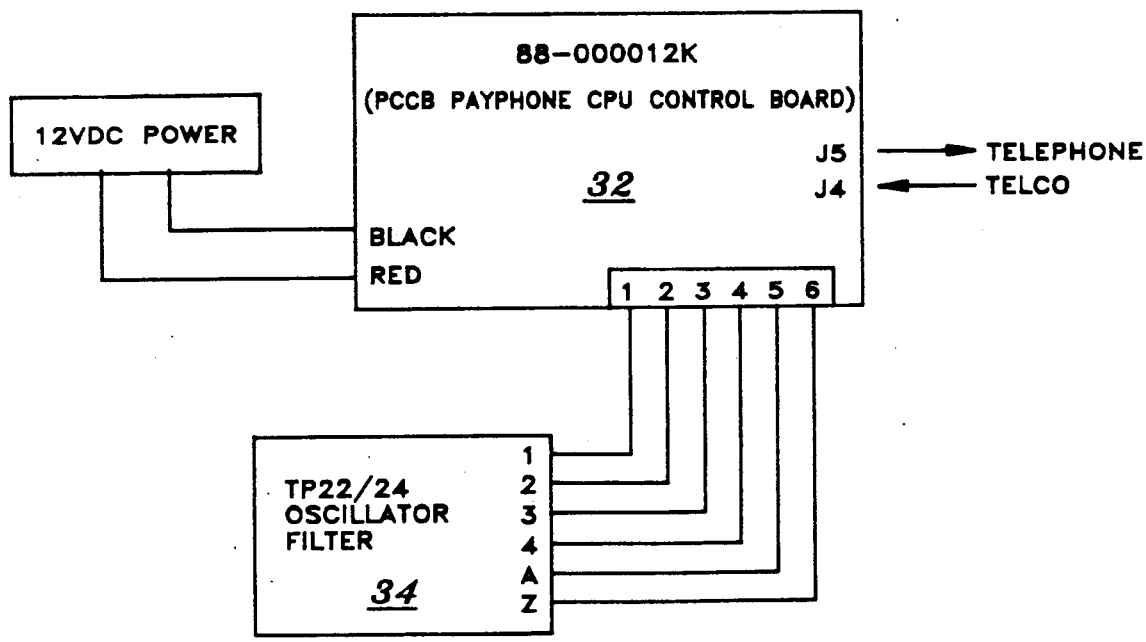
FIG. 3 is a schematic diagram of the microcomputer used in the present invention and its coupling to an oscillator-filter for generating the tone-bursts required for the tariffing of the call made.

Referring to FIG. 2 for now, there is shown, in summary manner, the sequence of events by which a call may be made and completed via the present invention. After initial reset (block 22) and initialization of the system (block 24), the system of the invention awaits "off-hook" detection (block 26), which means that the phone has been taken off-hook, and loop-current flowing, by which a call is ready to be made. During the dialing of the digits of the telephone number on the payphone, the system of the invention reads such DTMF signals (block 28), converts them to binary code for storage in the microcomputer of the invention, and also determines the last digit of the telephone number dialed (block 30). This last-digit determination may be achieved via digit-determination, such as that set forth in U.S. Pat. No. 4,658,096, or may be accomplished by a simple time-out process, i.e., after a preset time has elapsed, it will be assumed that the last digit has been dialed. Typically, such a time period may be between 4 and 10 seconds. After determining the last digit of the dialed telephone number, the system of the invention will determine if the telephone number dialed is, in fact, a valid number, which is accomplished by "lookinq up" the first two or three digits of the dialed number, or what may be termed the "exchange" thereof, in its "look-up" table, which is stored in EPROM or nonvolatile RAM, and, if such exchange is valid, it is then checked for a respective tariffing rate associated with it. If such a rate is found (block 32), then the system of the invention will automatically calculate the rate of tone-pulse generation for tariffing purposes (block 34). The system will then send the dialed telephone number to the central office for the land-based, switched telephone network, or to the radio base station via over-the-air transmission in a cellular network. After such time, the system of the invention will perform answer-supervision (block 36), during which there will be determined whether the called party has picked up the phone at that end, or whether there is a slow busy signal generated, or the like. Assuming that the call has been answered, with the concomitant breaking of the ringback tone-signals, which indicates that the called phone has been answered, then the call is monitored and tariffing tone-pulses are generated at periodic intervals depending upon the cost of the call, all of which is initially determined during the validation process (block 38). The system will continually check to see if the phone has again been placed "on-hook" again (block 40), and, if it has, then the system returns to the "wait" state, disconnecting the call, with tariffing also being terminated.

Figure 4:
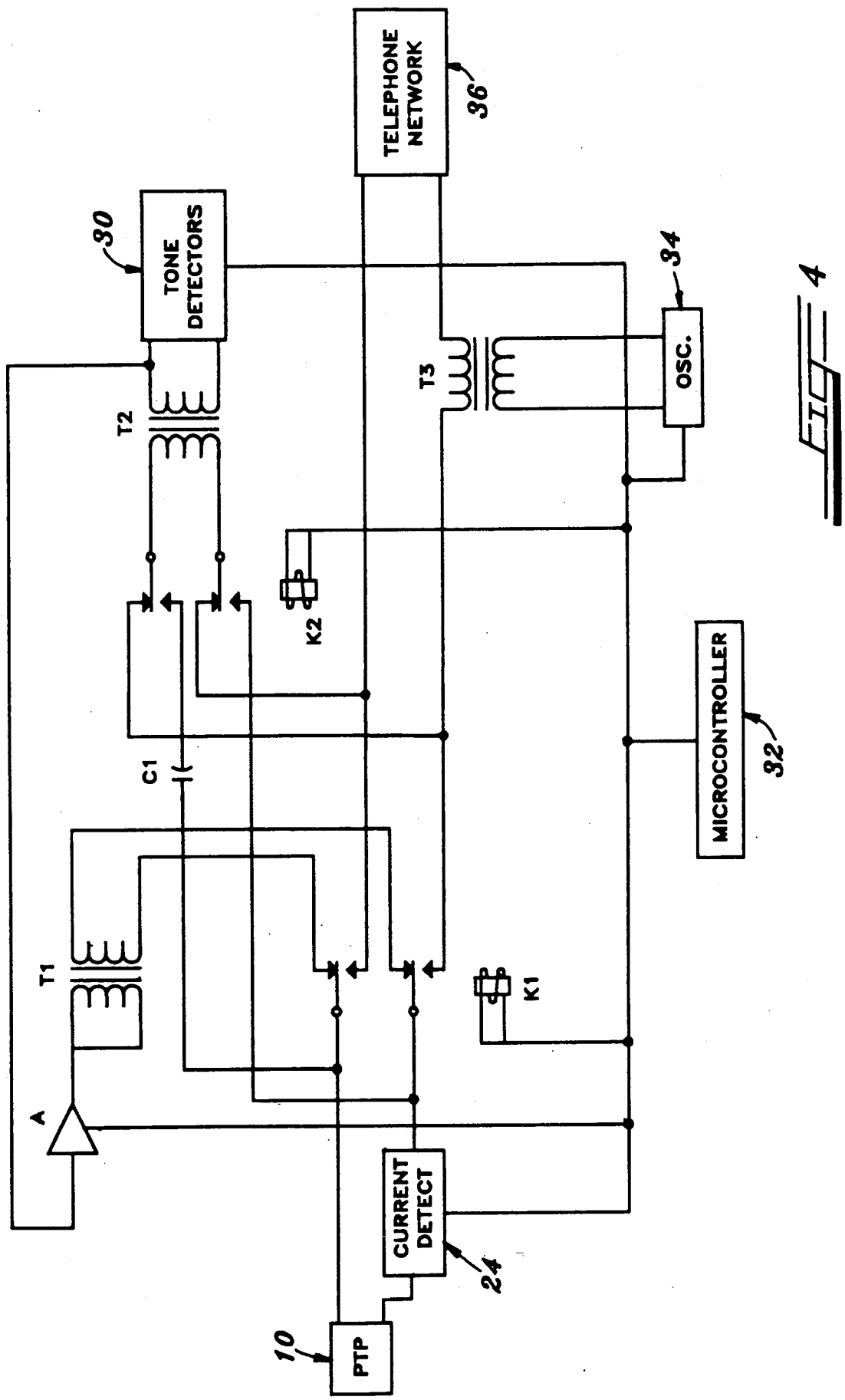
FIG. 4 is a schematic diagram showing the switching circuitry for isolating the pay-telephone terminal from its coupling to the central office, or to the cellular transceiver, after a call has been determined as being valid and sent on for further, processing and completion.

Referring to FIG. 4, there is shown a schematic diagram for coupling the pay-telephone terminal to the switched telephone network, or to the cellular network, and for isolating it during the answer-supervision process. The conventional, international-type coin-operated pay-telephone 10 has associated with it a conventional "off-hook" current detector 24 for determining when the phone is taken off-hook. The pay-telephone 10 is coupled to the telephone network 26, which may be a land-line central office, or may be the cellular system, via first relay-switch K1, in a first state thereof. The switch K1, during the initial operation of the payphone, which is during the making of a telephone call, isolates the payphone from the telephone network 26. While the call is being dialed on the payphone 10, and the DTMF signals generated, the DTMF signals are sent to conventional tone-detectors, which form part of an overall series of conventional tone-detectors 30, for DTMF conversion thereby, into binary-coded information for subsequent transmission to microcomputer 32. The tone-detectors 30 are conventional and may be that manufactured by Mitel Corporation, Model No. MT8880. The DTMF signals are transferred to the tone-detectors via a second relay-switch K2 and transformer T2. Capacitor C1 eliminates DC loading. After the digits of the telephone number have been dialed on the pay-telephone unit 10, and the DTMF signals separately converted by the tone-detectors 30 and subsequently sent for storage to the microcontroller 32, the dialed telephone number is checked against a "look-up" table for a valid telephone number, and is also checked for a valid tarrifing rate structure associated therewith. If the microcontroller 32 does determine that it is a valid telephone number that has been dialed, the call is allowed to continue, which, as described above, may be either the central office of the land-based, switched telephone network, or the base station of a cellular network, otherwise, the call is discontinued. With switch K1, which is controlled by the microcontroller 32, in its first state thereof, the pay-telephone unit 10 is disconnected, or isolated, from the telephone network 26. This isolation is necessary to ensure that any input from the pay telephone unit 10 does not affect the answer-supervision process that is to be carried on by the system of the invention, to be described below in greater detail. With the switch K1 in its first state thereof, by which the pay telephone unit 10 has been isolated from the telephone network 26, this switch connects the pay-telephone unit to a transformer T1 operatively coupled to the tone-detectors 30, by which the pay-telephone unit 10 may monitor the progress of the telephone call, by either hearing a busy signal, the ring-back signal, or the like, so that the caller may hear. Amplifier A drives the transformer T1. After the telephone number has been sent to the telephone network 26, the second relay K2 is energized, placing the switch thereof in a second state thereof, by which the coupling of the transformer T2, and, therefore, the tone-detectors 30 is opened from the connection with the pay-telephone unit 10, and switched over to connection to the telephone network 26, whether it be the land-based switched telephone network, or the cellular network. In this state, which is shown in FIG. 4, the process of callanswering supervision is carried out by the invention. The tone-detectors 30 detect the unique tones received via the telephone network 26, which tones are either indicative of a busy signal, the ringing signal, or the like. That is, the frequency tones, as well as the spaces or periods between frequency tones, define a tone-cadence signal from the telephone network by which a number of states may be indicated: The first one indicating a fast busy signal, the second one indicating a slow busy signal, and a third one indicating a ringback signal which indicates the called phone is ringing. Under the first two signals generated, the system of the invention, in the conventional manner, via the microcontroller 32 and the software associated therewith, will terminate the call, as will be described below in greater detail. For the third signal, the ringback signal, the software of the invention will determine if and when the called phone has been taken "off-hook" and the call answered. This is achieved by detecting a break in the normal pattern of the ringback-generation signal, which is conventional. Alternatively, after, for example, ten ringback signals, the system of the invention will automatically terminate the call as indicating that the called party is not at home. The tone-signals with associated cadence, or intervals between tone pulses, are generated by the telephone network 26 and are conventional. It is understood, that in the case of a cellular network, as described above, the telephone network (block 26) will include not only the base cellular station, but also the transceiver unit 16 and cellular interface unit 14, described above in regards to FIG. 1.

If the dialed telephone number has been determined to be correct and the called phone actually goes off-hook, then detection thereof will be achieved via the software associated with the microcontroller 32, by the detection of a break in the ringback tone-signals. Upon such detection via the microcontroller 32, there will begin the tariffing of the phone call; that is, the microcontroller will, according to the invention, generate the tone-bursts via oscillating circuitry 34, which oscillating circuitry produces a tone-pulse typically in the 12K to 16k range via transformer T3. The rate at which these tone bursts are generated depends upon the cost of the call, as determined initially by the microcontroller and the look-up table associated with the exchange of a dialed telephone number. The more expensive the long distance call made, the more frequent will be generated the tone-bursts by the oscillating circuitry 34. When the microcomputer has determined that the call has been answered, it will energize relay K1 in order to place the switch associated therewith into the second state thereof, which second state couples the pay-telephone terminal to the telephone network.

In accordance with international standards, at the outset of placing a call, the calling party will place a fixed amount of money into the coin slot associated with the pay telephone, or, alternatively, receive initial credit via a credit card, from which the system of the invention will debit at specified intervals, which debiting takes place at each tone-burst generated by the oscillating circuitry 34. Typically, according to the invention, each tone-burst will subtract one currency unit from the amount placed initially into the pay telephone. Of course, such units will vary from country to country.

Figure 5:
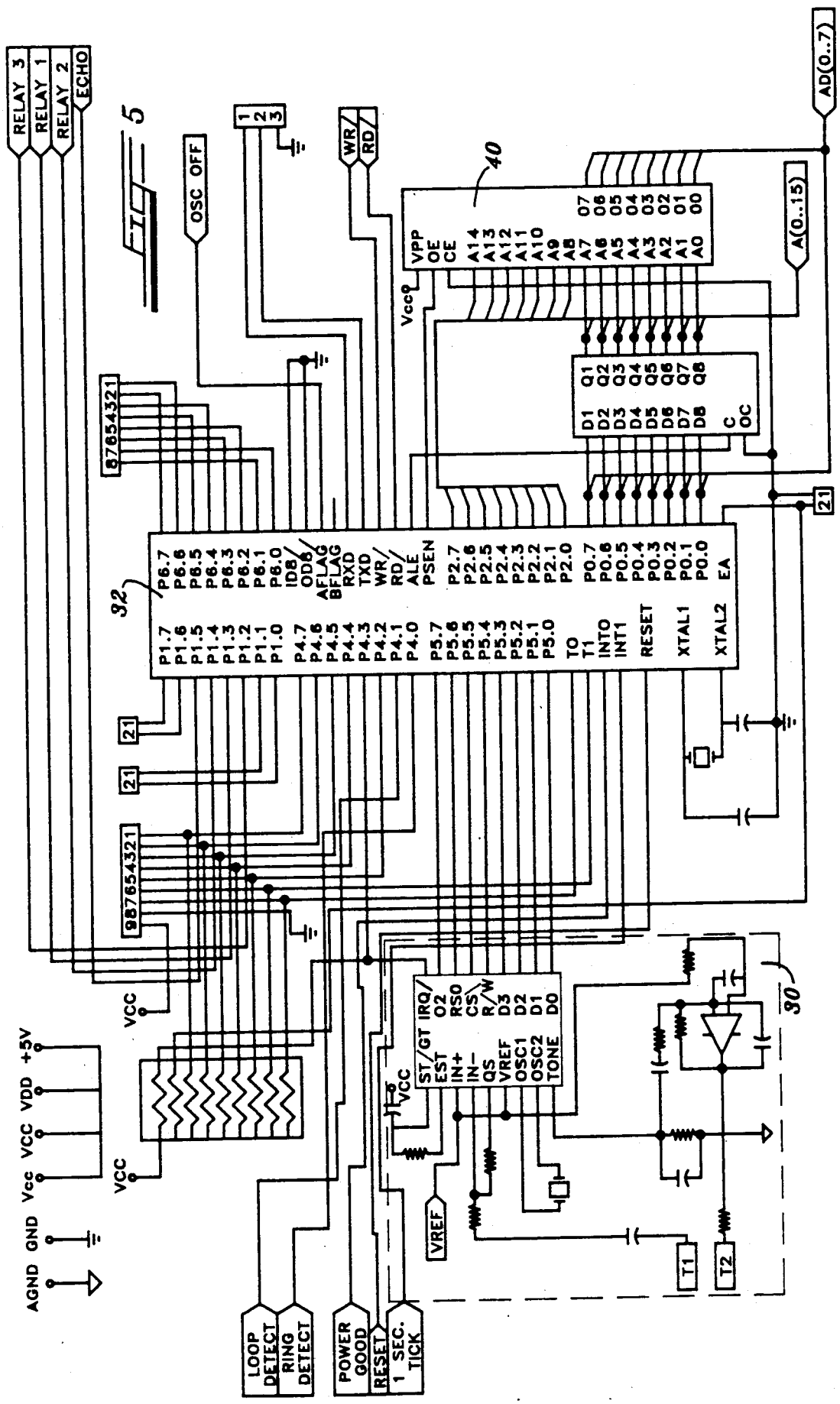
FIG. 5 is a hardware diagram showing the coupling of the microcomputer of the invention, its inputs and outputs, and its connections to the tone-detectors.

FIG. 5 shows a schematic of the microcontroller 32 and its coupling to the tone-detectors 30, which tone-detectors 30 are indicated in dashed-line block 55. As mentioned above, the tone detectors 30 are conventional. The microcontroller 32 may be that manufactured by Intel Inc., Microprocessor BOC451-LCC. Associated with the microprocessor 32 is EPROM 40. The software for controlling the microcontroller 32 is described below in greater detail.

Figure 6:
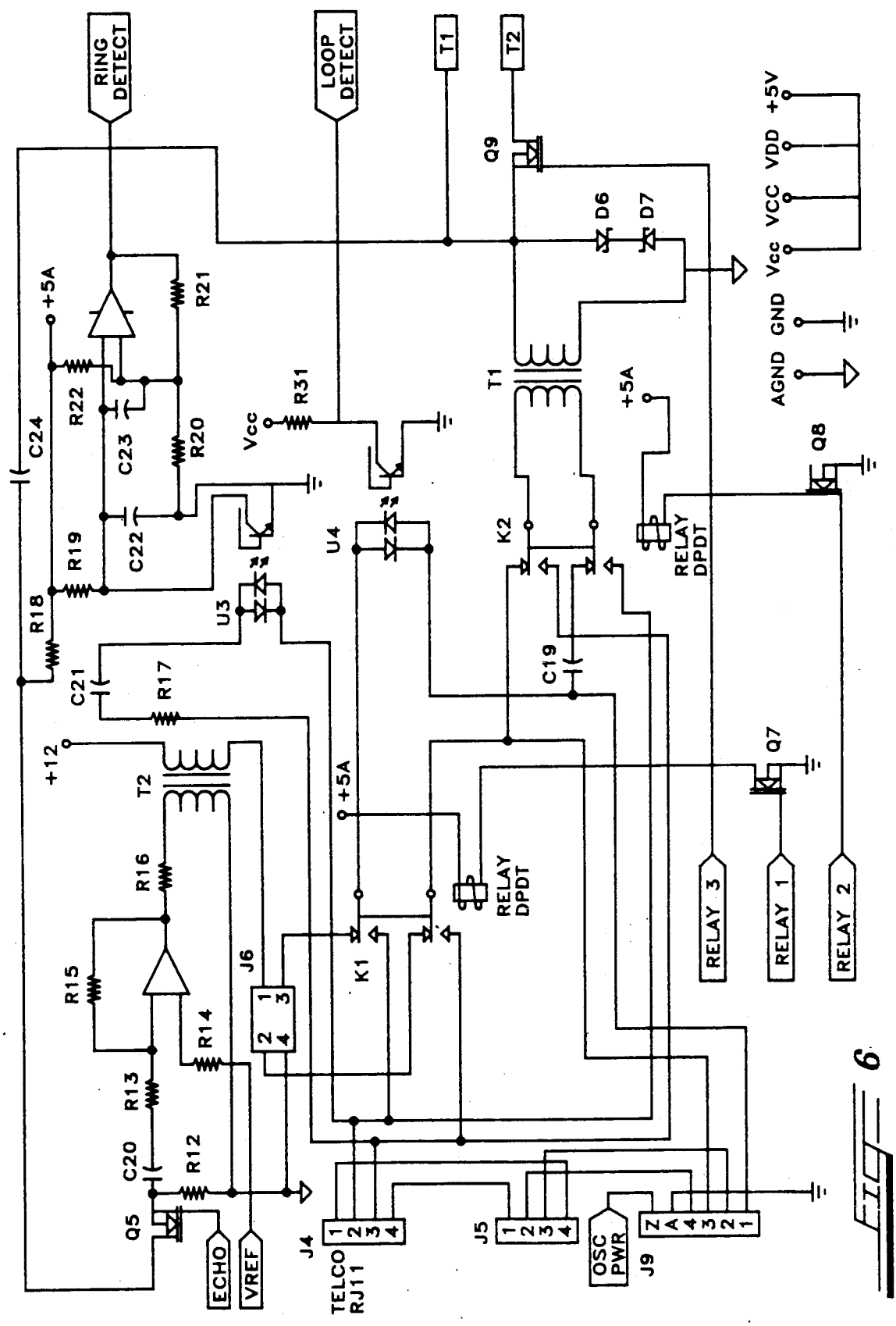
FIG. 6 is a schematic diagram showing in greater detail the switching circuitry shown in FIG. 4.

FIG. 6 shows the schematic switching diagram, discussed above in reference to FIG. 4, in greater detail. One additional element shown in FIG. 6 is the ring-detect indicated in block 42, which generates a ring-sequence generation for the pay-telephone by which a ringing thereof may be achieved, which is conventional. The elements C1, T2, K1 and K2 discussed above are shown in respective blocks in FIG. 6.

Figure 7:
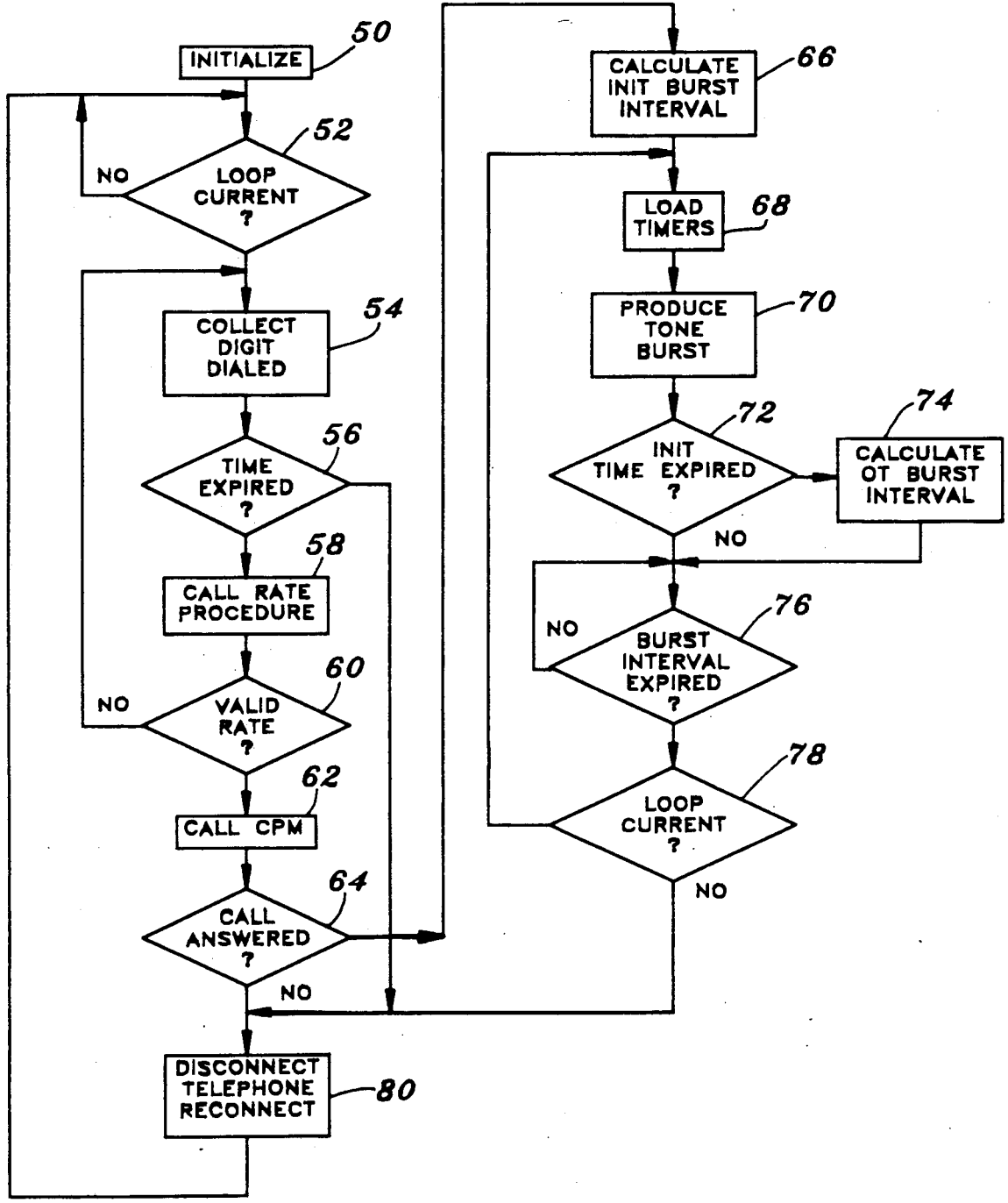
FIG. 7 is a flow chart showing the operation of the system of the invention from initialization to the completion of a call.

Referring now to FIG. 7, there is shown the call-management routine of the invention. At the outset, there is initialization (block 50), and the detection of loop-current (block 52), which detects if the phone has been taken off-hook. The dialed digits are collected (block 54), and the last digit determined by a timer (block 56). Thereafter, the dialed telephone number is checked against the "look-up" table in EPROM, and the call-rate procedure (block 58) is initiated to determine whether a valid rate (block 60) is present. If a valid rate is present, then the call-progress monitoring process is carried out (block 62) and the system waits to see if the call is answered (block 64), and, if it is, then the initial burst-interval is calculated (block 66) which determines the initial period, such as one minute, after which overtime will commence; at such point, the timers are loaded. Typically, there are two timers (block 68), and a tone-burst is produced (block 70) for tariffing, which in the case of the initial period, will be the first tone-burst representing the base or non-overtime rate for that call. If the initial time period has expired (block 72), which typically may be up to 1 minute from the beginning of the call, then the overtime timer takes over, and the overtime burst-intervals are calculated (block 74). If the overtime burst interval has expired, then another tone-burst will be generated (block 76), if loop-current detection is present (block 78) which means the phone is still off-hook, with the procedure repeated from block 68 through 78, with that tone-burst being generated for collecting the appropriate amount. The process will go on until off-hook current detector (block 78) detects that no further current is present, meaning that the phone has been placed "on-hook" again, thereby indicated the phone call has been terminated, and, thereby, disconnecting the telephone from the telephone network (block 80). The phone would also be disconnected (block 80) if the called party does not answer the phone, which is typically up to 10 rings (block 64).

Figure 8:
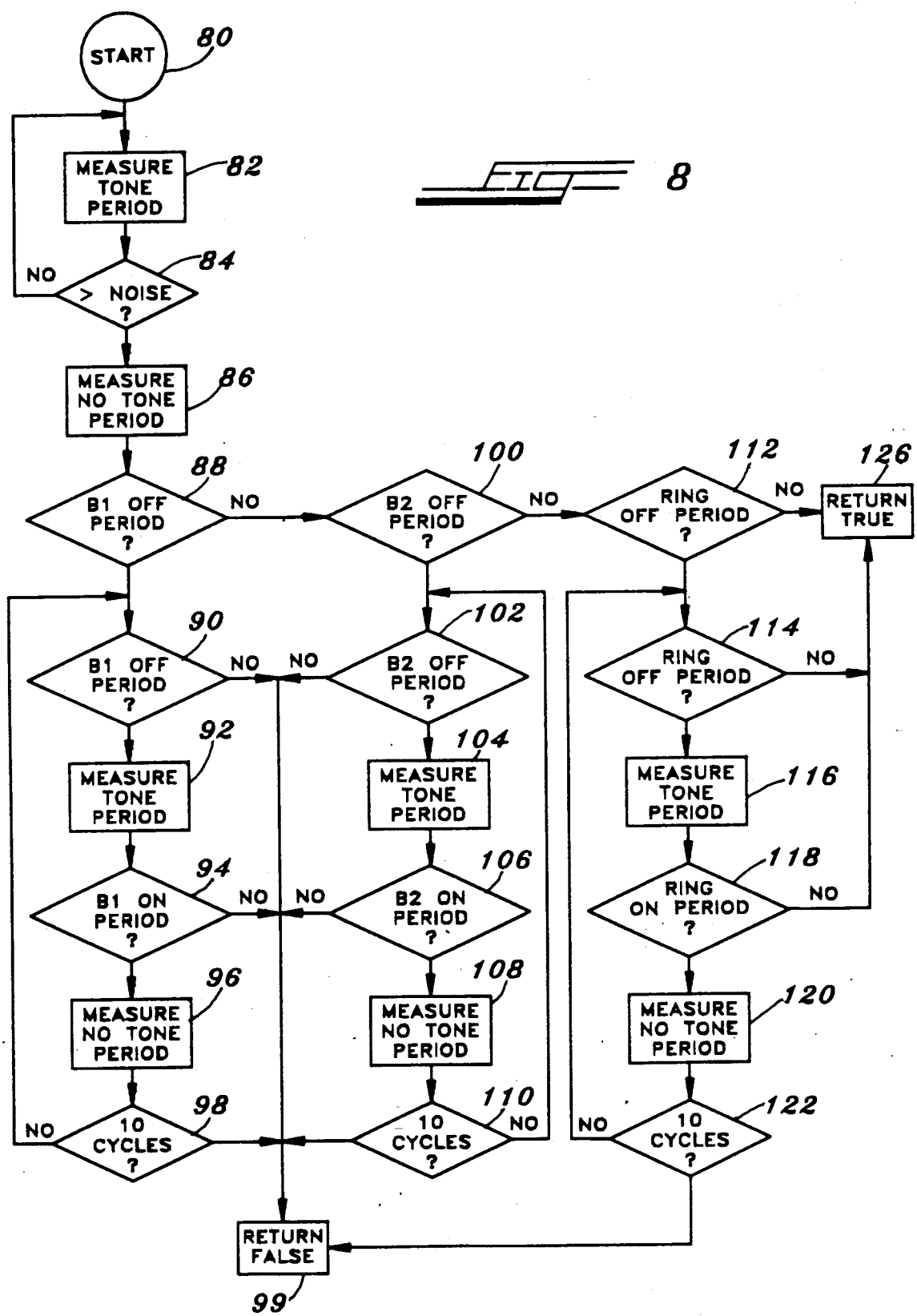
FIG. 8 is a flow chart showing the flow of events during call-progressing and tone-detection of the invention.

FIG. 8 is a flow chart showing call-progressing according to the invention. At the start (block 80), the tone-signal is received and detected via the tone detectors 30. The invention will measure the tone period, or length of the tone received (block 82), after all noise been eliminated (block 84). Thereafter, the interval, or cadence, between tones (block 86), or the "no-tone" period, is measured, and the software of the invention will determine what type of tone-cadence sequence has been received. In an example shown in FIG. 8, there are three possible types of signals that may be received: Bi indicating fast busy signal, B2 indicating a slow busy signal, and "ring-off" indicating the called the phone is ringing. For example, if it has been determined that the cadence of the received signal is indicative of B1, then the sequence of events will follow along the column for BI. If it is not B1, then the system will determine whether it is B2 or "ring-off" signaling. When any one of the three signals has been determined to have been received, then the flow of events is basically the same for each. For example, for Bl, if such is the signal received (blocks 88, 90), then the tone period thereof is measured (block 92), and it is thereafter determined whether the period of time that these tone-periods are "on" is within the required specifications for the B1 signal (block 94). If not, then the system will indicate a false signal (block 96) and return to initial state. If it is true, then the "no tone" period or cadence is measured (block 96) and the system will check to see if ten cycles have been achieved, after which, the system will automatically indicate a "false" signal and return to the initial state (block 98). If it had been less than ten cycles, the system repeats itself in a loop (90 through 98). If during any one loop, the "off" period between tones or the "on" period or the time of each tone, is not found to be within the parameters of the B1 signal, then a "false" signal is generated and the system returns to its original state. The same holds true for the other signals B2 or "ring off", indicated by blocks 100 through 1lO, and 112 through 132, respectively. Of course, the only signal by which further call-progressing is to be carried out is the "ring off" signal starting at block 112. Under this flow of events, after ten rings have been accomplished, then a "false" signal is generated (block 122, 96) to the microprocessor. However, if during call-progress monitoring, after it has been determined that the signal is a "ring-back" signal, starting with block 112, at any point during the ten loops of determination whether the call has been answered or not, if such signal has been terminated as indicated by a "no" in blocks 114 and 118, as well as in block 1!2 which would indicate initial answering of the phone before any ring generation has occurred, then a true response (block 126) is generated and the call is connected and proceeds in a normal fashion until no loop-current is detected (block 78 of FIG. 7), which would indicate that the phone has been placed "on hook" again. It is understood that while three separate signal types have been indicated (FIG. 8), that more or less may be used. The fast-busy signaling represented by B1 would indicate the lack of network connection, while the slow busy signal (B2) would be indicative of the called phone being in use. In fact, there may be up to five separate signals generated by which the invention may detect and control the payphone.

Figure 9:
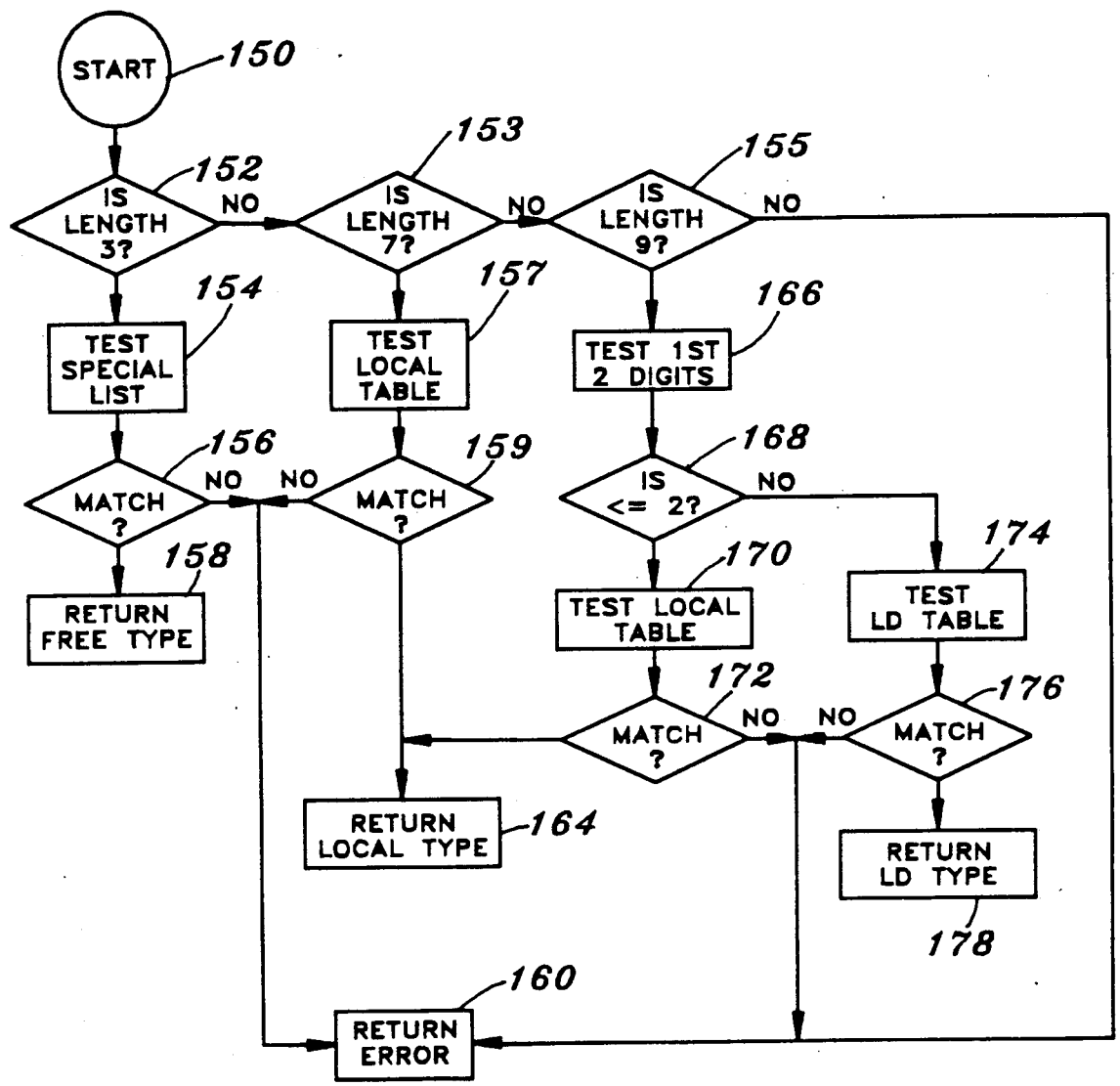
FIG. 9 is a flow chart showing the procedural steps for rate-determination at the outset upon having completed the dialing of a telephone number at the local pay telephone terminal site.

Referring to FIG. 9, there is shown an exemplary flow chart for rate determination, the one being shown being that for Thailand. At the start, (block 150) and when the dialed digits have been dialed in DTMF format into the payphone, there is initially checked to see whether the length of the phone number is either 3, 7 or 9 on blocks 152, 154 and 156. When the dialed number has been determined to have been dialed, either by the time-out method or last-digit analysis, as described above, that number is checked against the "lookup" table (block 154) in EPROM associated with the microcomputer 30, or, alternatively, in order to save time, each number after it has been dialed, is checked against the look-up table and if there is a match (block 156), then the call is allowed to be consummated at a free, no charge rate (block 158), while if there is no match, then an error is indicated (block 160). If the length is determined to be 7 (block 153), then it is indicative of a local call (block 156) and the phone number dialed is matched against the "look-up" table in EPROM (block 157); if it does not match, an error signal is generated (block 159), while if there is a match block 164), the call is consummated as a local call, which may or may not be chargeable. If the length is determined to be greater than 7, depending upon the country in which the system is used, then the number is checked to see if it is a long distance call, which is done by testing the first two digits of the phone number (block !66). If, for example, the first two digits are each less than or equal to 2 (block 168), then such would be indicative of a local call (block 170), upon which a match look-up would be generated (block 172), and if a match is found in the "look-up" table of the EPROM, then the call progresses (block 164), while if there is no match, then the call terminates (block 160). If the first two digits are greater than 2, then such would be indicative of a long-distance call (block 174) and it would further investigate to see if there was a match in the "look-up" table (block 176). If there is match, then the long-distance flag would be set for that call. It is, of course, emphasized that such is shown only by way of example, and the length of the dialed telephone number that is checked will of course vary from country to country, as well as the determination as to which constitutes a local call, a free call or a long distance call.

The following is a listing of the source code for controlling microprocessor 30, for carrying out the above-described operations. The programming language is PL/M.

```
$title('Subcon Thialand Demo. X1.0.')
$workfiles(:f2:) optimize(1) rom(large)
siam_main:
Do;
$include(plm51.com)
$include(reg451.dcl)
$include(:f1:iodef.dcl)
$include(:f1:clockx.elt)

Declare
        (Counter_1,second_counter) word external,
        (toll,atoll) byte external,
        (rx_ready,flash_iu_led,loop_off) bit external, current_number_buffer (10) byte auxiliary, Aux_devices byte at (0B000H) auxiliary, relay_on bit at (0ECH) reg,
        MT_int   bit at (0C3H) reg, pulse_interval word auxiliary, (digit_count,i,type) byte;

Start_time_base:
    Procedure external;
        End;

Serial_init:
    Procedure external;
        End;

Init_mt8880:
    Procedure external;
        End;

Read_8880_data:
    Procedure byte external;
        End;

Read_8880_status:
    Procedure byte external;
        End;

Write_8880_data:
    Procedure (mitel_data) external;
        Declare mitel_data byte;
        End;

Write_8880_control:
    Procedure (mitel_data) external;
        Declare mitel_data byte;
        End;

Read_DTMF_digit:
    Procedure byte external;
        End;
```

```
DTMF_numeric_value:
Procedure (digit_count) word external;
    Declare digit_count byte;
    End;

cpm:
procedure bit external;
    end;

pulse_12khz:
procedure;

declare count byte auxiliary;

relay_on is false;
    do count = 0 to 20;
        call time(100);
        end;
    relay_on is true;
    end;

rates:
procedure (buf_adr,buffer_length) byte external;
    declare buf_adr word, buffer_length byte;
    end;

determine_rate:
Procedure byte;

i = 0;
    second_counter = 00H;
    Do while second_counter < 8;
        if mt_int = 0 then do;
            Current_number_buffer(i) = read_dtmf_digit;
            second_counter = 0;
            i = i + 1;
            type = rates(.current_number_buffer,i);
            if type > 0 then return type;
            end;
        if loop_off then return 0;
        End;
    return 0;
    End;

General_outputs = 0;
General_inputs = 0FFH;
Call start_time_base;
Call serial_init;
Call init_mt8880;
Phone_to_tr is true;
relay_on is true;

Main_loop:
Do forever;

Do while loop_off;
        end;
    type = determine_rate;
if type = 4 then do while not loop_off;
    end;
else if type > 0 then do;
    if cpm then do;
        second_counter = 0;
```

```
            counter_1, pulse_interval = (6000 / toll) - 1;
            do while not loop_off;
                if counter_1 = 0 then do;
                    disable;
                    counter_1 = pulse_interval;
                    enable;
                    if second_counter = 60 then
                        pulse_interval = (6000 / atoll) - 1;
                    call pulse_12khz;
                    end;
                end;
            end;
        end;
    Phone_to_tr is false;
    counter_1 = 1000;
    do while counter_1 > 0;
        end;
    Phone_to_tr is true;
    End;
End;
$title ('NCT Rate Determination - Thailand V1.0')
Rate:
Do;
$include(plm51.com)

/* R. D. Godsey & Associates 60110
Modified rate module from SubCon Payphone to run on 8051 class
machines and for Thailand compatability.
*/

Declare rate structure (
        lngtbl  (320H) byte,
        loctbl  (320H) byte,
        altbll  (15E0H) byte,
        intbl   (44) byte,
        ottbl   (44) byte,
        fltbl   (44) byte,
        spare   (60) byte) at (320H) constant, (toll,atoll) byte public, type byte,
        (LD_code,local_code,subscriber) word, thailand_spec (6) word constant
            (100,101,191,123,199,195), /* call types */
        number_error    literally '0',
        local_call      literally '1',
        toll_call       literally '2',
        ld_call         literally '3',
        free_call       literally '4',
        incoming_call   literally '5';

Convert_dialed:
Procedure (buffer_ptr,count) address;

declare (count,i) byte, (result, buffer_ptr) address,
        buffer based buffer_ptr (16) byte auxiliary;

result = 0;
    count = count - 1;
    Do i = 0 to count;
```

```
            result = result * 10;
            result = result + buffer(i);
            end;
      return result;
      end;

Determine_charge:
procedure (index, local) bit;

declare (table_ptr, index) address, t_type byte, local bit,
        table based table_ptr (320H) byte constant;

if index < 200 then return false;
      index = index - 200;
      if local then t_type = rate.loctbl(index);
      else do;
           t_type = rate.lngtbl(index);
           if t_type = 0 then return false;
           else if t_type < 9 then do;
                t_type = t_type - 1;
                table_ptr =.rate.loctbl(t_type * 320H);
                t_type = table(subscriber - 200);
                end;
           end;
      if t_type >= 44 or t_type = 0 then return false;
      else do;
           toll = rate.intbl(t_type);
           atoll = rate.ottbl(t_type);
           return true;
           end;
      end;

test_list:
procedure (value,list_ptr,list_length) bit;

declare (list_ptr,value) word, (list_length,i) byte,
           list based list_ptr (40) word constant;

list_length = list_length - 1;
      do i = 0 to list_length;
           if value = list(i) then return true;
           end;
      return false;
      end;

Rates:
Procedure (number_adr,number_length) byte public;

declare number_adr word, number_length byte,
           tmpbuf based number_adr (30) byte auxiliary;

type = number_error;

if number_length = 3 then do;
           subscriber = convert_dialed(.tmpbuf,3);
        if test_list(subscriber,.thailand_spec,
            length(thailand_spec)) then do;
                type = free_call;
                toll = 0;
                atoll = 0;
                end;
           end;
```

```
      else if number_length = 7 then do;
          subscriber = convert_dialed(.tmpbuf,3);
          if determine_charge(subscriber,true) then
              type = local_call;
          end;

else if number_length = 9 then do;
          if convert_dialed(.tmpbuf,2) < 3 then do;
              subscriber = convert_dialed(.tmpbuf(2),3);
              if determine_charge(subscriber,true)=
                then type = local_call;
              end;
          else do;
              subscriber = convert_dialed(.tmpbuf(1),3);
              if determine_charge(subscriber,false)
                then type = ld_call;
              end;
          end;

else return number_error;
      return type;
      end;
  end;
$title('Timebase Functions, V1.0')
$intvector workfiles(:f2:) optimize(1) rom(large)
/*
    R. D. Godsey & Associates 60110

Generates 500 Hz clock for mitel chip
    Maintains a mSec countdown register
    Maintains a mSec countup register
    Maintains 1 Sec. interrupt from oki clock and current time.
    Provides a 1 Hz filter for loop detect
*/ timebase_functions:
do;
$include(plm51.com)
$include(reg451.dcl)
$include(:f1:iodef.dcl)
$include(:f1:clock.elt)

Declare
/* Public data */
        (Counter_1,fast_counter,second_counter)  word public, Current_time structure
            (hour byte, minute byte, second byte) public auxiliary, (fast_counter_on,Flash_iu_led,loop_off) bit public, (Flash_counter,loop_counter) word, Mitel_clock bit at (0CFH) reg, Loop_debounce    literally '500',
        Flash_count      literally '500',
        Timer_count      literally '(0FFFFH - (976 / 1)) + 1';

Suspend_clock:
    Procedure public;
```

```
        Clock_ctrl_f = clock_reset;
        Clock_ctrl_f = clock_24_12 or clock_reset;
        Clock_ctrl_f = 0;
        Clock_ctrl_e = 0100B;
        Clock_ctrl_d = clock_hold;
        Do while (clock_ctrl_d and clock_busy) > 0;
            End;
        Return;
        End;

Resume_clock:
Procedure public;

Clock_ctrl_d = 0;
        Clock_ctrl_e = 0100B;
        Return;
        End;

Start_time_base:
Procedure public;
        tmod = 00100001B; /* sets t0 as 16 bit timer,
            t1 as serial port timer */ et0,ex1,it1,pt0,ea = 1;
/* enables timer 0, external interrupt 1, interrupt 1
        edge flag, t) high priority, and all interrupts */ th0 = high(timer_count);
        tl0 = low(timer_count);
        tr0 = 1; /* starts time base */
        Call suspend_clock;
        Call resume_clock;
        Flash_iu_led,fast_counter_on is false;
        Flash_counter = flash_count;
        Loop_off = loop_detect;
        Loop_counter = loop_debounce;
        Return;
        End;

One_mSec:
Procedure interrupt 1 using 2;

tr0 = 0;
        th0 = high(timer_count);
        tl0 = low(timer_count);
        tr0 = 1;

Mitel_clock = not mitel_clock;
        If counter_1 > 0 then counter_1 = counter_1 - 1;
        if fast_counter_on then fast_counter = fast_counter + 1;

If loop_detect <> loop_off then do;
            If loop_counter = 0 then loop_off = loop_detect;
            Else loop_counter = loop_counter - 1;
            End;
        Else loop_counter = loop_debounce;
```

```
    If flash_IU_LED then do;
        Flash_counter = flash_counter - 1;
        If flash_counter = 0 then do;
            Flash_counter = Flash_count;
            In_use_led is not in_use_led;
            End;
        End;
    Return;
    End;

One_second:
Procedure interrupt 2 using 3;

Second_counter = second_counter + 1;

Current_time.hour = (am_pm_10hr and 00000011B) * 10;
    Current_time.hour=Current_time.hour+(hour and 00001111B);

Current_time.minute = (ten_min and 00001111B) * 10;
    Current_time.minute = Current_time.minute +
                            (minutes and 00001111B);
    Current_time.second = (ten_sec and 00001111B) * 10;
    Current_time.second = Current_time.second +
                            (seconds and 00001111B);

Return;
    End;

End;

$title('Mitel 8880 Interface, V1.0')
$intvector workfiles(:f2:) optimize(3) rom(large)
MT8880_interface:
Do;
/* Module for control of a Mitel MT8880 from an 80C451.
R. D. Godsey & Associates 60110
*/

$include(plm51.com)
$include(reg451.dcl)
$include(:f1:iodef.dcl)

declare
        Loop_off bit external,
        Counter_1 word external, (Mitel_input,i) byte,
        (integral,quiet_time,noise_time,count) byte auxiliary, (xmit_mode,ringback) bit, buffer_data     literally 'mitel_input', /* Mitel MT8880 interface constants */
        Mitel_clock       bit at (0CFH) reg,
        Mitel_reg_select  bit at (0CEH) reg,
        Mitel_cs          bit at (0CDH) reg,
        Mitel_read        bit at (0CCH) reg,
        Mitel_data        literally 'p5',
        Mitel_data_mask   literally '00001111B',
        MT_int            bit at (0C3H) reg,
```

```
/* Control Register A constants */
    Tone_enable     literally '00000001B',
    CP_enable       literally '00000010B',
    Int_enable      literally '00000100B',
    Reg_b_select    literally '00001000B', /* Status register constants */
    INT_request     literally '00000001B',
    Xmit_ready      literally '00000010B',
    Rcv_ready       literally '00000100B',
    No_DTMF         literally '00001000B';

Read_8880_data:
Procedure byte public;

Do while mitel_clock is 1;
        End;
    Mitel_cs,mitel_reg_select is 0;
    Do while mitel_clock is 0;
        End;
    Mitel_input = mitel_data and mitel_data_mask;
    Do while mitel_clock is 1;
        End;
    Mitel_cs,mitel_reg_select is 1;
    Return mitel_input and mitel_data_mask;
    End;

Write_8880_data:
Procedure (write_data) public;

Declare write_data byte;

Do while mitel_clock is 1;
        End;
    Mitel_cs,mitel_reg_select,mitel_read is false;
    Do while mitel_clock is 0;
        End;
    Mitel_data = (mitel_data and not mitel_data_mask) or
        (write_data and mitel_data_mask);
    Do while mitel_clock is 1;
        End;
    Mitel_cs,mitel_reg_select, mitel_read is true;
    Mitel_data = mitel_data or mitel_data_mask;
    Return;
    End;

Read_8880_status:
Procedure byte public;

Do while mitel_clock is 1;
        End;
    Mitel_cs is 0;
    Do while mitel_clock is 0;
        End;
    Mitel_input = mitel_data and mitel_data_mask;
    Do while mitel_clock is 1;
        End;
    Mitel_cs is 1;
    Return mitel_input and mitel_data_mask;
    End;
```

```
Write_8880_control:
Procedure (write_data) public;

Declare write_data byte;

Do while mitel_clock is 1;
        End;
    Mitel_cs, mitel_read is false;
    Do while mitel_clock is 0;
        End;
    Mitel_data = (mitel_data and not mitel_data_mask) or
            (write_data and mitel_data_mask);
    Do while mitel_clock is 1;
        End;
    Mitel_cs, mitel_read is true;
    Mitel_data = mitel_data or mitel_data_mask;
    Return;
    End;

Init_MT8880:
Procedure public;

Mitel_input = read_8880_status;
    Call write_8880_control(int_enable);
    End;

Read_DTMF_digit:
Procedure byte public;

Do while mt_int and not loop_off;
        End;
    If loop_off then return(0FFH);
    Do while (read_8880_status and no_dtmf) is 0;
        End;
    I =  read_8880_data;
    If I = 10 then return 0;
    Else if i = 0 then return 10;
    Else return i;
    End;

Dial_number:
Procedure (buffer_ptr) public;

Declare
        buffer_ptr word,
        buffer based buffer_ptr (32) byte auxiliary;

If mt_int is 0 then buffer_data = read_8880_data;
    Call write_8880_control(tone_enable or int_enable);
    I = 0;
    Do until end;
        Buffer_data = buffer(i);
        If buffer_data > 0FH then do;

Call write_8880_control(int_enable);
            Return;
            End;
        If buffer_data = 0 then buffer_data = 10;
        Else if buffer_data = 10 then buffer_data = 0;
        Call write_8880_data(buffer_data);
        Do while mt_int is true;
            End;
```

```
            Mitel_input = read_8880_status;
            I = i + 1;
            End;
        Return;
        End;

End;

$title('Call Progress Monitor. V1.0')
$intvector workfiles(:f2:) optimize(3) rom(large)
call_progress:
Do;
$include(plm51.com)
$include(reg451.dcl)
$include(:f1:iodef.dcl)
/*
R. D. Godsey & Associates 60110
Call Progress Monitor for MT8880 CP detector and 80451 2-15-89
Ring on times changed for 1 sec ring tone for Thailand 3-23-90
*/ declare
        (fast_counter_on,Loop_off) bit external,
        (Counter_1,fast_counter,second_counter) word external,
        MT_clock            bit at (0CFH) reg,
        MT_int              bit at (0C3H) reg, /* Control Register A constants */
        Tone_enable     literally '00000001B',
        CP_enable       literally '00000010B',
        Int_enable      literally '00000100B',
        Reg_b_select    literally '00001000B', /* Call progress monitor constants */
        ring_on_min     literally '450',
        ring_on_max     literally '550',
        ring_off_min    literally '3600',
        ring_off_max    literally '4400',
        busy_1_on_min   literally '225',
        busy_1_on_max   literally '275',
        busy_1_off_min  literally '225',
        busy_1_off_max  literally '275',
        busy_2_on_min   literally '225',
        busy_2_on_max   literally '275',
        busy_2_off_min  literally '225',
        busy_2_off_max  literally '275';

Read_8880_status:
    Procedure byte external;
        End;

Write_8880_control:
    Procedure (write_data) external;
        Declare write_data byte;
        End;

send_serial:
    procedure (x) external;
        declare x byte;
        end;
```

```
send_time:
procedure;

declare (d,t) word auxiliary;

d = 1000;
    t = fast_counter;
    do while d > 0;
        call send_serial((t / d) + '0');
        t = t mod d;
        d = d / 10;
        end;
    call send_serial(cr);
    call send_serial(lf);
    return;
    end;

cp_on:
procedure bit;

declare (integral,limit) byte auxiliary;

integral = 0;
    do limit = 1 to 40;
        if mt_int then integral = integral + 1;
        call time(5);
        end;
    if integral >  10 then return true;
    else return false;
    end;

on_time:
procedure word;

fast_counter = 0;
    fast_counter_on is true;
    do while cp_on is true and fast_counter < ring_on_max;
        if loop_off then return false;
        end;
    fast_counter_on is false;
/*      call send_time; */
    return (fast_counter);
    end;

off_time:
procedure word;

declare old_count word;

fast_counter = 0;
    fast_counter_on is true;
    do while cp_on is false and fast_counter < ring_off_max;
        if loop_off then return false;
        end;
    fast_counter_on is false;
/*      call send_time; */
    return (fast_counter);
    end;

cadence_lock:
procedure bit;

declare cycle_counter byte, cycle_time word auxiliary;

cycle_counter = 0;
```

```
       second_counter = 0;

start_noise:
     cycle_time = on_time;
     if second_counter >= 60 or loop_off is true-
                           then return false;
     if cycle_time < 64 then repeat start_noise;
     if cycle_time > ring_on_max then return true;

cycle_time = off_time;

busy_2_cycle:
     If cycle_time >= busy_2_off_min and cycle_time
                    <= busy_2_off_max then do;
                       cycle_time = on_time;
        if cycle_time >= busy_2_on_min and cycle_time
                    <=busy_2_on_max then do;
           cycle_counter = cycle_counter + 1;
           if cycle_counter < 10 then do;
              cycle_time = off_time;
              if not loop_off then repeat busy_2_cycle;
              end;
           return false;
           end;
        return true;
        end;

busy_1_cycle:
     If cycle_time >= busy_1_off_min and cycle_time
                    <= busy_1_off_max then do;
        cycle_time = on_time;
        if cycle_time >= busy_1_on_min and cycle_time
                    <= busy_1_on_max then do;
           cycle_counter = cycle_counter + 1;
           if cycle_counter < 10 then do;
              cycle_time = off_time;
              if not loop_off then repeat busy_1_cycle;
              end;
           return false;
           end;
        return true;
        end;

ring_cycle:
     If cycle_time >= ring_off_min and cycle_time
                    <= ring_off_max then do;
        cycle_time = on_time;
        if cycle_time >= ring_on_min and cycle_time
                    <= ring_on_max then do;
           cycle_counter = cycle_counter + 1;
           if cycle_counter < 10 then do;
              cycle_time = off_time;
              if not loop_off then repeat ring_cycle;
              end;
           else return false;
           end;
        end;
     return true;
     end;
```

```
cpm:
procedure bit public;

declare status bit;

Dialer_to_TR is true;
    call time(240);
    Phone_to_TR is false;
    Echo is true;
    Call write_8880_control(cp_enable or int_enable);
    status = cadence_lock;
    Call write_8880_control(int_enable);
    if status is true then do;
        Echo is false;
        Phone_to_TR is true;
        call time(240);
        Dialer_to_TR is false;
        Return true;
        End;
    else do;
        dialer_to_TR is false;
        return false;
        end;
    End;
End;
```

While a specific embodiment of the invention has been shown and described, it is to be understood that numerous changes and modifications may be made therein without departing from the scope, spirit and intent of the invention as set forth in the appended claims.

What we claim is:

1. An apparatus for providing central-office functions locally at a pay-phone terminal, comprising:
an international-type pay-telephone;
interfacing means coupled to said pay-telephone for providing two-way communications between said pay-telephone and a telephone network;
said interfacing means comprising means for storing tarrifing information by which the cost of a call made on said pay-telephone may be determined; first tone-detector means for receiving tone-signals from the telephone network; tone-burst generating means for periodically generating a tone-burst to said pay-telephone by which the money-collection of a call is achieved; and computer means coupled to said means for storing tariffing information, to said tone-detector means, and to said tone-burst generating means for controlling the operations thereof.

2. The apparatus for providing central-office functions at a pay-telephone according to claim 1, wherein said interfacing means further comprises second tone-detector means for receiving DTMF signals from the pay-telephone and converting them for use by said computer means; said second tone-detector means also being operatively coupled to said computer means; and off-hook detection means for detecting the off-hook status of the pay-telephone, said off-hook detection means being coupled to said pay-telephone.

3. The apparatus for providing central-office functions at a pay-telephone according to claim 1, wherein said computer means further comprises means for determining the frequency of generation of tone-bursts by said tone-burst generating means based upon the tariffing information of said means for storing tariffing information, said computer means enabling said tone-burst generating means in order that the tone-bursts generated therefrom be spaced apart by the time period determined by said means for determining.

4. The apparatus for providing central-office functions at a pay-telephone according to claim 3, wherein each said tone-burst generated by said tone-burst generating means is within a range of between 12K and 16K or 50 hertz.

5. The apparatus for providing central-office functions at a pay-telephone according to claim 3, wherein said means for determining the frequency of generation of tone-bursts by said tone-burst generating means comprises first memory means and data stored in said first memory means representing the source-code listing of a software program for calculating the period between tone-bursts.

6. The apparatus for providing central-office functions at a pay-telephone according to claim 3, wherein said tone-burst generating means for periodically generating a tone-burst to said pay-telephone comprises oscillating means coupled to said computer means and to said pay-telephone.

7. The apparatus for providing central-office functions at a pay-telephone according to claim 5, wherein said tone-burst generating means for periodically generating a tone-burst to said pay-telephone comprises oscillating means coupled to said computer means and to said pay-telephone.

8. The apparatus for providing central-office functions at a pay-telephone according too claim 1, wherein said interfacing means further comprises first switching means for isolating said pay-telephone from the telephone network during call-progress monitoring in order to prevent interference with the signals from the telephone network.

9. The apparatus for providing central-office functions at a pay-telephone according too claim 5, wherein said interfacing means further comprises first switching means for isolating said pay-telephone from the telephone network during call-progress monitoring in order to prevent interference with the signals from the telephone network.

10. The apparatus for providing central-office functions at a pay-telephone according to claim 8, wherein said first switching means comprises two stable states thereof, a first stable state coupling said pay-telephone to the telephone network, and a second said stable state thereof; said interfacing means further comprising tone-signal transmission means coupled too said tone-detector means for transmitting received tone-signals from the telephone network during call-progressing, said first switching means in said second stable state thereof coupling said pay-telephone to said tone-signal transmission means, whereby busy and ring-back tone signals may be heard by the user of the pay-telephone while still being isolated from the telephone network.

11. The apparatus for providing central-office functions at a pay-telephone according to claim 9, wherein said first switching means comprises two stable states thereof, a first said stable state coupling said pay-telephone to the telephone network, and a second said stable state thereof; said interfacing means further comprising tone-signal transmission means coupled to said tone-detector means for transmitting received tone-signals from the telephone network during call-progressing, said first switching means in said second stable state thereof coupling said pay-telephone to said tone-signal transmission means, whereby busy and ring-back tone signals may be heard by the user of the pay-telephone while still being isolated from the telephone network.

12. The apparatus for providing central-office functions at a pay-telephone according too claim 8, wherein said interfacing means further comprises off-hook detection means for detecting the off-hook state of said pay-telephone; said interfacing means further comprising second switching means coupling said tone-detector means to said off-hook detection means in a first state thereof, and coupling said tone-detector means to the telephone network in a second state thereof.

13. The apparatus for providing central-office functions at a pay-telephone according too claim 9, wherein said interfacing means further comprises off-hook detection means for detecting the off-hook state of said pay-telephone; said interfacing means further comprising second switching means coupling said tone-detector means to said off-hook detection means in a first state thereof, and coupling said tone-detector means to the telephone network in a second state thereof.

14. The apparatus for providing central-office functions at a pay-telephone according to claim 12, wherein each of said first and second switching means is also coupled to said computer means for operational control therefrom.

15. The apparatus for providing central-office functions at a pay-telephone according too claim 1, further comprising a cellular interfacing means, and a cellular transceiver, said cellular interfacing means being coupled between said interfacing means and said cellular transceiver, whereby calls may be made over the cellular telephone network.

16. The apparatus for providing central-office functions at a pay-telephone according to claim 1, wherein said means for storing tariffing information comprises a first memory means for storing the prefixes of valid telephone numbers that may be called via said pay-telephone, and a second memory means for storing the rate information associated with said valid telephone numbers.

17. The apparatus for providing central-office functions at a pay-telephone according to claim 5, wherein said means for storing tariffing information comprises a second memory means for storing the exchanges of valid telephone numbers that may be called via said pay-telephone, and a third memory means for storing the rate information associated with said valid telephone numbers; said means for determining the frequency of generation of tone-bursts by said tone-burst generating means retrieving said tariffing information from said second and third memory means in order to determine the rate of tone-bursts to be generated based upon the telephone number dialed on said pay-telephone.

18. The apparatus for providing central-office functions at a pay-telephone according to claim 17, wherein said means for determining the frequency of generation of tone-bursts by said tone-burst generating means comprises means for analyzing at least the first two digits dialed, and for determining if a valid telephone number has been dialed by comparison with said information stored in said second and third memory means.

19. In an international-type pay-telephone, which international-type pay-telephone charges a customer in response to the reception of periodic tone-bursts, wherein the improvement comprises:
   interfacing means coupled to said pay-telephone for providing two-way communications between said pay-telephone and a telephone network;
   said interfacing means comprising means for storing tariffing information by which the cost of a call made on said pay-telephone may be determined; tone-detector means for receiving tone-signals from the telephone network; tone-burst generating means for periodically generating a tone-burst to said pay-telephone by which the money-collection of a call is achieved; and computer means coupled to said means for storing tariffing information, to said tone-detector means, and to said tone-burst generating means for controlling the operations thereof.

20. The improvement according to claim 19, in combination with a cellular transceiver, and cellular interfacing means coupling said interfacing means to said cellular transceiver, whereby said pay-telephone may make calls over the cellular telephone system.

21. The improvement according to claim 20, wherein said computer means further comprises means for determining the frequency of generation of tone-bursts by said tone-burst generating means based upon the tariffing information of said means for storing tariffing information, said computer means enabling said tone-burst generating means in order that the tone-bursts generated therefrom be spaced apart by the time period determined by said means for determining.

22. The improvement according to claim 21, wherein said interfacing means further comprises first switching means for isolating said pay-telephone from the cellular telephone system during call-progressing in order to prevent interference with the signals from the telephone network.

23. The improvement according to claim 21, wherein said interfacing means further comprises off-hook detection means for detecting the off-hook state of said pay-telephone; said interfacing means further comprising second switching means coupling said tone-detector means too said off-hook detection means in a first state thereof, and coupling said tone-detector means to the telephone network in a second state thereof.

24. An apparatus for providing central-office functions locally at a pay-phone terminal, comprising:
an international-type pay-telephone;
interfacing means coupled too said pay-telephone for providing two-way communications between said pay-telephone and a telephone network;
a cellular transceiver; and
a cellular interface coupling said cellular transceiver too said interfacing means, whereby calls may be made over the cellular system on said international-type of pay-telephone.

25. The apparatus according to claim 24, wherein said interfacing means comprising means for storing tariffing information by which the cost of a call made on said pay-telephone may be determined; tone-detector means for receiving tone-signals from the telephone network; tone--burst generating means for periodically generating a tone-burst to said pay-telephone by which the money-collection of a call is achieved; and computer means coupled too sad means for storing tariffing information, to said tone-detector means, and to said tone-burst generating means for controlling the operations thereof.

26. The apparatus for providing central-office functions at a pay-telephone according to claim 25, wherein said computer means further comprises means for determining the frequency of generation of tone-bursts by said tone-burst generating means based upon the tariffing information of said means for storing tariffing information, said computer means enabling said tone-burst generating means in order that the tone-bursts generated therefrom be spaced apart by the time period determined by said means for determining.

27. The apparatus for providing central-office functions at a pay-telephone according to claim 26, wherein said means for determining the frequency of generation of tone-bursts by said tone-burst generating means comprises first memory means and data stored in said first memory means representing the source-code listing of a software program for calculating the period between tone-bursts.

28. The apparatus for providing central-office functions at a pay-telephone according to claim 227, wherein said interfacing means further comprises means for isolating said international-type pay-telephone during call-origination from said cellular telephone system and for coupling said pay-telephone to said cellular system after the call has been determined to have been answered.

29. The apparatus for providing central-office functions at a pay-telephone according to claim 28, wherein said interfacing means further comprises means for coupling said pay-telephone to said tone-detectors when said means for isolating said international-type pay-telephone during call-origination origination from said cellular telephone system has effected such isolation in order for the calling party to hear the tone-signals received from the cellular telephone system.

30. A method of making a call using an international-type pay-telephone, comprising:
a) inputting a telephone number into an international-type pay-telephone;
b) determining the last digit input;
c) storing the number in a computer;
d) determining the validity of the telephone number input;
e) thereafter, transmitting a valid telephone number to a telephone system for completing the call;
f) isolating the international-type pay-telephone from the telephone system until the called number has answered;
g) coupling the international-type pay-telephone to the telephone system when the called number has answered.

31. The method according too claim 30, further comprising:
(h) determining the tariff-rate for the telephone number input during the step (a); and
i) generating periodic tone-bursts to the international-type pay-telephone after said step (g) based on the determination of tariff-rate from said step (i) for periodic collection from the value initially credited.

32. The method according to claim 31, wherein said (i) comprises generating more frequent tone-bursts the more expensive the call input.

33. The method according to claim 331, wherein said step (f) comprises coupling the international-type pay-telephone to tone-detectors in order to allow the user of the pay-telephone to hear signals generated by the telephone system during call-progress monitoring.

34. The method according to claim 33, wherein said step (c) comprises converting DTMF signals to digital data by coupling tone-detectors to the international-type pay-telephone in order to receive the input telephone digits of the telephone number; and further comprising:
j) coupling the tone detectors to the telephone system after said step (d);
said step (j) also decoupling the tone detectors from the international-type pay-telephone, whereby the tone-detectors are in operative communication with the telephone system in order to receive the tone-signals therefrom during call-progress monitoring.

* * * * *